Dec. 19, 1967     P. S. ECKHOFF     3,358,877
CARRYING BAIL AND METHOD OF APPLYING SAME
Original Filed July 17, 1964
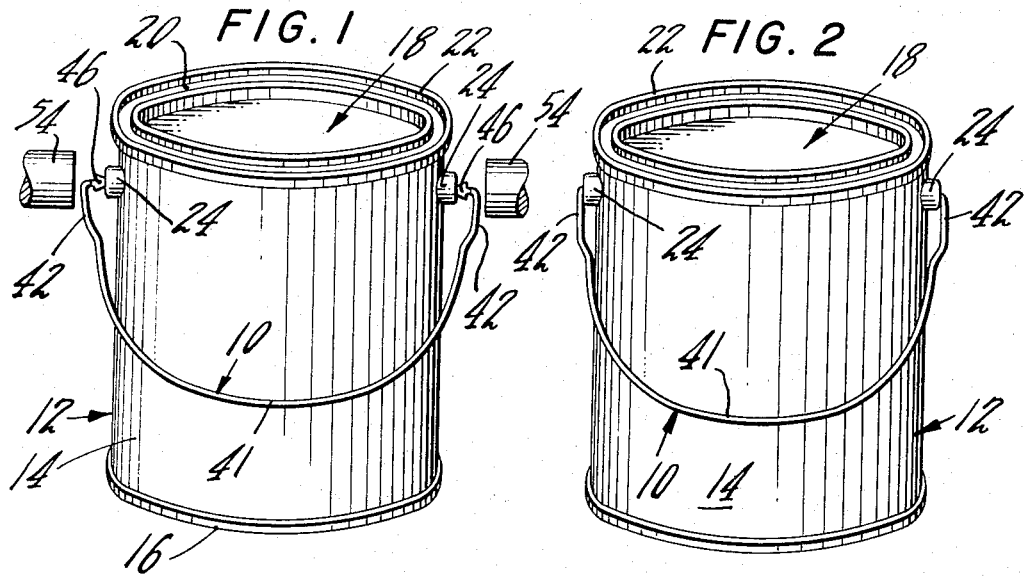
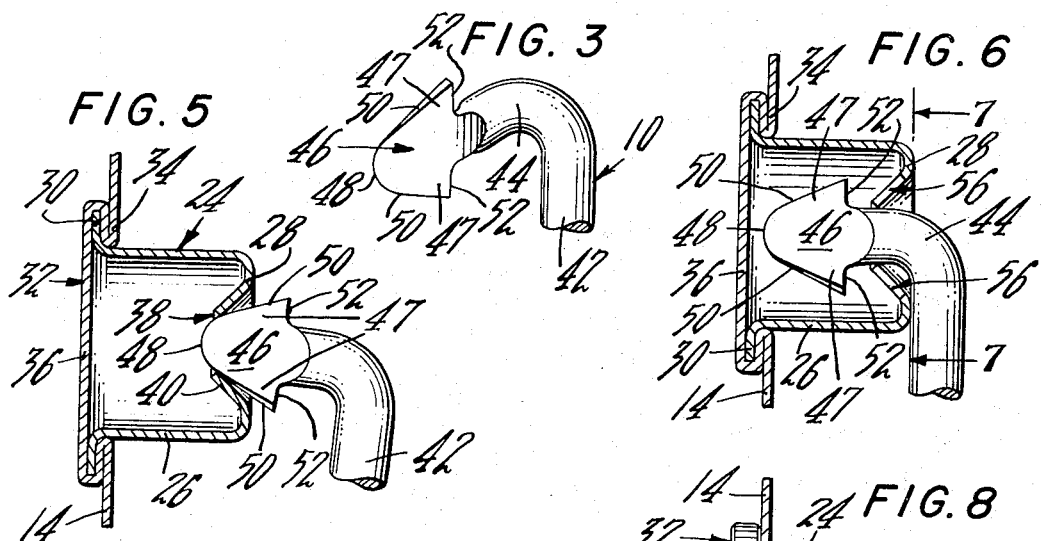
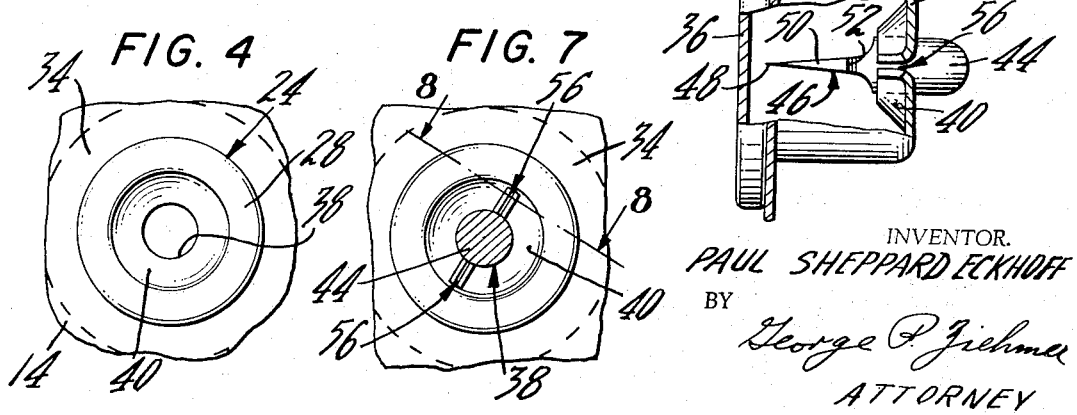
INVENTOR.
PAUL SHEPPARD ECKHOFF
BY
George P. Ziehme
ATTORNEY United States Patent Office 3,358,877
Patented Dec. 19, 1967

3,358,877
CARRYING BAIL AND METHOD OF
APPLYING SAME
Paul Sheppard Eckhoff, Oyster Bay, N.Y., assignor to American Can Company, New York, N.Y., a corporation of New Jersey
Continuation of application Ser. No. 383,469, July 17, 1964. This application June 27, 1966, Ser. No. 562,426
1 Claim. (Cl. 220—95)

ABSTRACT OF THE DISCLOSURE

A U-shaped carrying bail has at each of its ends a thin tapered cutting barb so that when the barbs are positioned against the side walls of the bail ears, the opposite ends of the bail can be rapped sharply to drive the barbs inwardly to slit and pass through the outer walls of the bail ears, the barbs being tapered and having at their outer ends shoulders which are thicker than the width of the slits so that the barbs are positively retained in the bail ears to prevent removal of the bail from the can.

---

This is a continuation of application Ser. No. 383,469, filed July 17, 1964.

The present invention relates to containers which are provided with carrying bails, and has particular reference to an improved bail construction and to a method of attaching the same to the container.

At the present time, carrying bails made of heavy wire, are used extensively to provide a means for carrying large cans filled with heavy products such as paint or the like. These bails are either formed and attached to the cans by automatic machines which are too expensive for use in slow speed can making or can filling lines, or are preformed and attached to the cans in a manual operation. In the latter event, the bails are preformed with their ends bent into a complicated, multiple-bend, hook formation which requires that they be inserted into the bail ears of the can in a complicated twisting operation which is tedious to the inserter and is slow and time consuming.

The present invention contemplates the provision of a barbed bail which is so formed as to permit its application to the can by a simple preliminary positioning and a subsequent pressure operation, and which is thus adapted to be applied to the can either completely manually, completely automatically, or by combined manual-automatic operations. These latter manual-automatic operations, wherein the ends of the bail are preliminarily positioned in the bail ears by a manual operation and the bail is subsequently pressed into finally seated position by a simple, inexpensive machine, is particularly practical because it makes minimal demands on the operator and yet permits can filling lines to run at moderate speeds with minimal labor requirements and without the substantial capital investment necessitated by a completely automatic bailing machine.

An object of the invention, therefore, is the provision of a can bail of improved design which can be easily attached to a can in a simple pressure operation.

Another object is the provision of such a bail which can be preliminarily positioned in the bail ears of a can and will remain in position therein, by virtue of its own spring-action, until it is finally seated in the bail ears by a simple pressure operation.

Still another object is the provision of a can bail which is designed to at least partially cut its own inserting opening in the bail ears in such a manner that it cannot be inadvertently withdrawn from the ears.

Yet another object is the provision of a method of applying a bail to a can in simple, easily performed operations.

Still another object is the provision of a can bail having anchoring barbs which are substantially coplanar with the handle portion of the bail and which thus permit the bails to be arranged in stacked relationship during shipment and/or storage with minimum risk of mutual entanglement.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of a can having a barbed bail embodying the principles of the instant invention preliminarily located in the bail ears of the can as a step in the instant method invention;

FIGURE 2 is a view similar to FIGURE 1 but showing the bail in fully seated position at the conclusion of the instant method of insertion;

FIG. 3 is a perspective view of one end of the barbed bail of FIGS. 1 and 2;

FIGS. 4 and 5 are enlarged vertical sectional details taken substantially through the bail ears and bail ends shown on the right hand sides of FIGS. 1 and 2 respectively, parts being broken away;

FIG. 6 is an end view of the bail ear of FIG. 4 prior to the insertion of the bail thereinto;

FIG. 7 is a view similar to FIG. 4 but showing the bail ear as it appears after the bail has been inserted thereinto, the view being taken substantially along the line 7—7 in FIG. 4; and FIG. 8 is a fragmentary horizontal section taken substantially along the line 8—8 in FIG. 7.

As a preferred and exemplary embodiment of the instant invention, the drawings illustrate a U-shaped carrying bail 10, made of heavy round steel wire, used in conjunction with a sheet metal can 12 to provide a convenient package for carrying a heavy product such as paint.

The can 12 is formed with a cylindrical body 14 and an imperforate bottom end member 16 and preferably has its upper end sealed by a friction plug 18 which seats within a friction ring 20 which is secured to the upper end of the body 14 in any conventional manner, as by a top double seam 22.

A pair of hollow, sheet metal bail ears 24 are secured in place in the upper end portion of the can body 14 in diametrical opposition to each other.

Each bail ear 24 is formed with a cylindrical side wall 26, an outer end wall 28, and an inner flange 30 which provides the means for securing the ear in place on the can. As seen in FIGS. 4 and 5, the bail ears 24 are preferably held in place in a recess 32, which is formed in the body 14, by means of an annular fold 34 which is formed in the body 14 outwardly of the flange 30 so that the latter is clinched between the bottom wall 36 of the recess 32 and the fold 34. However, the bail ears 24 may also be held in place in any other suitable manner, as by soldering, welding, cementing, etc.

The end wall 28 of each bail ear 24 is formed with a centrally located circular opening 38 which is of substantially the same or of slightly larger diameter than the wire from which the bail 10 is made and is disposed at the bottom of a substantially frusto-conical indentation 40 which is formed in the wall 28.

The bail 10 is preferably substantially semi-circular in shape and has a central handle portion 41 and a pair of short outwardly offset portions 42, one of which is formed at the end of each of its legs. The end of each offset portion 42 is bent inwardly at right angles to form an inwardly extending hook portion 44 which terminates in an integral barb 46 of wedge-shaped or chisel-shaped configuration having a pair of oppositely disposed side wings 47 which project laterally beyond the hook 44.

As best seen in FIG. 3, each barb preferably is formed with a rounded front end 48 which merges into a pair of laterally divergent side edges 50 which at their ends form a junction with the ends of a pair of sharp-edged shoulders 52 which project laterally beyond and are disposed at substantially right angles to the hook portion 44 and form the rear edges of the side wings 47.

Each barb 46 is substantially uniformly tapered in longitudinal cross-section from its front end 48 to its shoulders 52 so that the front end 48 is formed with a chisel edge and the sharp-edged shoulders 52 are of substantial thickness, as seen in FIG. 3.

The bail 10 is initially formed so that the spacing between the oppositely disposed front ends 48 of the barbs 46 is approximately equal to, or even smaller than, the diameter of the body 14. In any event, the spacing between the barbs 46 is substantially less than the diametral distance between the bottoms of the indentations 40 of the opposed bail ears 24.

In applying the bail 10 to the can 12, the opposing legs of the bail are pulled apart and the front edges of the barbs 46 of the thus flexed bail are placed in the indentations 40, after which the legs of the bail are released. Because of the inherent resiliency of the bail wire, the released bail remains firmly in place in the bail ears in the position shown in FIGS. 1 and 4 with its handle portion 41 in engagement with the can body 14. Thereafter the opposite ends of the bail are rapped sharply, preferably by means of a pair of oppositely disposed pressure members 54, to drive the barbs 46 radially inwardly into fully seated position in the bail ears 24, as shown in FIGS. 2 and 4.

During this inward movement of the barbs 46, their side wings 47 cut into the metal of the indentations 40 and actually form a pair of open slits 56 therein. However, the inherent resiliency of the metal of the bail ears 24 causes the slits 56 to close up slightly behind the wings 47 so that the spacing between the inwardly turned edges of the slits 56 is slightly less than the width of the bail shoulders 52, as best seen in FIG. 8. As a result, the barbs 46 cannot be inadvertently withdrawn through the slits 56, and so remain permanently seated in the bail ears 24. The cutting of the slits is accomplished without substantial collapse or deformation of the bail ear because the relatively sharp front edges of the side wings 47 facilitate easy initial penetration of the metal of the indentations 40.

It is desirable that even in its fully seated position (shown in FIGS. 2 and 4), the bail be in a slightly outwardly flexed condition so that it exerts a slight spring tension against the bail end walls 28, the reason for this being two-fold, firstly, to insure that the barb shoulders 52 be positively kept from engagement with the inturned edges of the slits 56 so that there is no interference between these parts when the bail is lifted into its upright, carrying position, and secondly, to insure that the offset portions 42 of the bail remain in contact with the bail ears 24 to keep them as close as possible to the can body 14 to thus minimize the possibility of their engaging and damaging the labels of adjacent cans when the cans are packed in shipping cartons.

The dimensions of the bail 10 are such that the inner edges of the offset portions 42 engage the end walls 28 of the bail ears 24 before the front edges of the barbs 46 reach the recess wall 36, so that the barbs 46 are thus prevented from puncturing the wall 36. In other words the distance between the inside, bail ear-contacting edge of the offset 42 and the apex of the front end 48 of the barb is somewhat less than the distance between the outer surfaces of the walls 28 and 36. Also, the distance between the inside edge of the offset 42 and the shoulders 52 is greater than the depth of the indentation 40 to insure the desired spacing between the shoulders 52 and the indentations 40.

Because of the tapering shape and consequent wedging or chisel-like action of the barbs 46, a great deal of force is not required to seat them in the bail ears 24. In practice, it has been found that the bails 10 can be seated merely by striking them with the palms of the hands. However, if a great number of bails are to be inserted, as in an assembly line, it is obviously desirable to use a simple mechanical device to effect this bail seating action.

Because of the fact that the flexed bails are held in the position of FIG. 1 by their inherent resiliency, they may be preliminarily positioned in the bail indentations, either manually or automatically, at one station and the cans, with the bails thereon, then conveyed to another station where the bails can be driven home in a separate operation, thus imparting greater flexibility to can line arrangement.

It will be understood that various structural modifications may be employed with satisfactory results. For example, the opening 38 in the bail ear may in some instances be omitted, and the bail relied upon entirely to form an opening in the ear to receive the barb 46 and the hook 44. Also, it would be possible in some instances to omit the indentation 40 and form the opening 38 in the flat outer wall of the bail ear, relying completely on the partial insertion of the front end 48 of the barb 46 in the opening 38 to provide for the temporary anchorage of the bail in the can prior to the final insertion of the barbs into the bail ears. In this latter event, it might be found desirable to somewhat enlarge the opening 38, care being taken not to make the opening larger in diameter than the width of the barb. The illustrated form, is however, the most desirable one, because it provides not only for easy insertion of the barbs 46, but because of the strength of the indentation 40, provides a bail ear which is strong enough to support the weight of the filled can without substantial deformation when the can is carried by the bail.

In following the instant bail applying method, it may be desirable to hold the bail 10 in a substantially horizontal plane while it is being inserted into the bail ears 24. If this is done, the slits 56 will be horizontal, and the barbs 46 will thereafter be completely out of alignment with them, both when the bail is in its inclined non-carrying position of FIG. 2, and when it is in its vertical, can-carrying position. This will further minimize any tendency for the barbs 46 to be inadvertently withdrawn through the slits 56.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

A can comprising a can body, a pair of hollow bail ears on opposite sides of said body, each of said ears having an outer wall with an inwardly extending indentation, a circular opening located in the center of said indentation, a pair of slits in said outer wall, each of said slits extending outwardly from said circular opening and having sides which project inwardly, a substantially U-shaped wire bail having a substantially semi-circular central handle portion, a pair of hook portions, each of said hook portions merging with and extending inwardly from one of said offset portions, a pair of thin cutting barbs, each of said barbs comprising a substantially flat thin rounded front end, a pair of side edges merging with said front end and diverging as they progress outwardly from said end, a pair of laterally projecting shoulders, each of said shoulders merging with one of said side edges at the point thereon which is farthest away from said front end and from the other of said side edges, and each pair of said laterally projecting shoulders merging with one of said hook portions at the end of said one hook portion, said barbs being tapered over their entire area so that they are thinnest at said front ends and thickest at their said shoulders, said shoulders having a thickness only a fraction of the diameter of the remainder of said wire bail, but greater than the width of said slits, each of said barbs being disposed within one of said hollow bail ears so that said offset portion engages the outside surface of said outer wall.

References Cited
UNITED STATES PATENTS

| | | | |
|---|---|---|---|
| 886,011 | 4/1908 | Nichols | 220—91 |
| 944,696 | 12/1909 | Schmidt | 220—91 |
| 2,176,711 | 10/1939 | Gorman | 220—91 |
| 3,016,136 | 1/1962 | Poupitch | 16—125 |
| 3,170,592 | 2/1965 | Ullman et al. | 220—91 |

RAPHAEL H. SCHWARTZ, *Primary Examiner.*

THERON E. CONDON, *Assistant Examiner.*